United States Patent
Gaydoul (12) 
(10) Patent No.: US 12,168,276 B2
(45) Date of Patent: Dec. 17, 2024

(54) SEALING DEVICE, SEALING SYSTEM, AND METHOD FOR SEALING A LEAKAGE FLOW AT A MACHINE ELEMENT

(71) Applicant: HERMETIK HYDRAULIK AB, Djursholm (SE)

(72) Inventor: Jürgen Gaydoul, Djursholm (SE)

(73) Assignee: HERMETIK HYDRAULIK AB, Djursholm (SE)

( * ) Notice: Subject to any disclaimer, the term of this patent is extended or adjusted under 35 U.S.C. 154(b) by 0 days.

(21) Appl. No.: 17/799,989

(22) PCT Filed: Jun. 17, 2021

(86) PCT No.: PCT/EP2021/066387
§ 371 (c)(1),
(2) Date: Aug. 16, 2022

(87) PCT Pub. No.: WO2022/262978
PCT Pub. Date: Dec. 22, 2022

(65) Prior Publication Data
US 2024/0181585 A1    Jun. 6, 2024

(51) Int. Cl.
*F16J 15/40* (2006.01)
*B23Q 11/00* (2006.01)

(52) U.S. Cl.
CPC .......... *B23Q 11/0075* (2013.01); *F16J 15/40* (2013.01)

(58) Field of Classification Search
CPC .............................. F16J 15/40; B23Q 11/0075
See application file for complete search history.

(56) References Cited

U.S. PATENT DOCUMENTS

| | | | | |
|---|---|---|---|---|
| 2,908,515 A | * | 10/1959 | Copp | ................ F16J 15/40 |
| | | | | 277/516 |
| 3,334,906 A | | 8/1967 | Walter | |
| 4,505,115 A | * | 3/1985 | Arbuckle | ............... F15B 3/00 |
| | | | | 60/579 |
| 4,629,196 A | | 12/1986 | Joniec | |

FOREIGN PATENT DOCUMENTS

| | | |
|---|---|---|
| DE | 2063822 | 7/1972 |
| DE | 10 2015 107772 | 12/2015 |
| DE | 102016210173 | 12/2017 |
| JP | S5980568 | 5/1984 |
| RU | 2084730 | 7/1997 |

* cited by examiner

*Primary Examiner* — Vishal A Patel
(74) *Attorney, Agent, or Firm* — RANKIN, HILL & CLARK LLP (57) ABSTRACT

A sealing device for sealing a leakage flow on a machine element, which is circular in cross section, of a working machine includes a housing, which has an upstream end and a downstream end and through which the machine element extends, an upstream pressure chamber which is arranged at the upstream end of the housing, a downstream pressure chamber which is arranged at the downstream end of the housing, and a sealing element which is arranged between the upstream pressure chamber and the downstream pressure chamber. The sealing element is mounted within the housing and rests sealingly against the machine element. A bypass line runs around the sealing element and fluidly connects the upstream pressure chamber to the downstream pressure chamber. A throttle element designed to reduce the pressure of a flowing leakage fluid by a predetermined pressure difference is arranged in the bypass line.

18 Claims, 4 Drawing Sheets

SEALING DEVICE, SEALING SYSTEM, AND METHOD FOR SEALING A LEAKAGE FLOW AT A MACHINE ELEMENT

FIELD OF INVENTION

The invention relates to a sealing device, to a sealing system, and to a method for sealing a leakage flow on a machine element, in particular for sealing a leakage flow on a rotating or linearly moving machine element which is used, for example, in rotary unions for shafts or bodies for spray nozzles on descaling systems with rotating nozzle heads or with linear movements on displacement pumps or on machines for pressure generation. Other conceivable applications for the invention can be the cleaning of containers, pipelines, and tubes in heat exchangers in the process industry, surface treatment in the steel, aluminum, and metal industry, and many other high-pressure applications such as paint removal on ships and structures, concrete renovation, mining, and tunneling.

BACKGROUND

In an exemplary application of the invention, systems for descaling metal bodies, such as are used in steel or aluminum production, work with high water pressures in the range from 1000 bar to 4000 bar. Hydraulic seals for these descaling systems which withstand such high water pressures pose a particular challenge when rotating machine elements have to be sealed using a rotary union. In descaling systems, these machine elements are the rotating nozzle heads, while in systems for pressure generation, the machine elements are pistons or plungers that perform a linear movement.

The object of the invention is to create a solution that provides a low-maintenance and low-loss seal in a structurally simple manner, which seal is suitable, for example, for descaling systems with rotating nozzle heads or pressure-generating systems with linearly moving pistons or plungers.

Overview of the Invention

This object is achieved with a sealing device having the features according to claim 1.

The sealing device according to the invention for sealing a leakage flow on a machine element, which is a circular in cross section, of a working machine working with a working fluid under high pressure comprises a tubular housing which has an upstream end and a downstream end and through which the machine element which is circular in cross section can extend, an upstream pressure chamber which is arranged at the upstream end of the housing, a downstream pressure chamber which is arranged at the downstream end of the housing, a sealing element which is arranged between the upstream pressure chamber and the downstream pressure chamber, which sealing element is mounted within the housing and which at least in portions sealingly rests against the machine element moving relative to the sealing element, a bypass line running around the sealing element, which bypass line is arranged to run at least in portions within the housing and which is designed to fluidly connect the upstream pressure chamber to the downstream pressure chamber, and a throttle element designed to reduce a pressure of a leakage fluid flowing from the upstream pressure chamber through the bypass line to the downstream pressure chamber by a predetermined pressure difference, which throttle element is arranged between the upstream pressure chamber and the downstream pressure chamber in the bypass line, wherein the leakage fluid is a part of the working fluid under high pressure.

The object on which the invention is based is also achieved by a sealing system having the features according to claim 13.

The sealing system according to the invention comprises an inlet sealing unit having the features of the sealing unit according to any of claims 1 to 12, an outlet sealing unit having the features of the sealing unit according to any of claims 1 to 12, and a machine element of a working machine which is circular in cross section and extends in an axial direction and is designed to work with a working fluid under high pressure, wherein the inlet sealing unit and the outlet sealing unit are arranged in series one behind the other with respect to the axial direction of the machine element, and the corresponding sealing elements of the inlet sealing unit and the outlet sealing unit rest at least in portions sealingly against the machine element moving relative to the corresponding sealing element.

The object on which the invention is based is also achieved by a method.

In the method according to the invention for sealing a leakage flow on a machine element, which is circular in cross section, of a working machine working with a working fluid under high pressure using at least one sealing device according to any of claims 1 to 12, the sealing element of the at least one sealing device is brought into sealing contact with the machine element which is circular in cross section and extends in an axial direction. A first pressure is then set in the upstream pressure chamber of the at least one sealing device by means of the leakage fluid of the leakage flow, after which a second, predetermined pressure is then set in the downstream pressure chamber of the at least one sealing device by means of the throttle element arranged in the bypass line. Then, by means of a pressure difference obtained by the first pressure and the second predetermined pressure, the sealing element and the housing are displaced against one another with a sealing force.

Advantageous and expedient embodiments and developments of the invention are disclosed in the corresponding dependent claims.

The invention provides a way by which the sealing device reduces a high pressure of a leakage fluid resulting from a working fluid in the upstream pressure chamber via the bypass line and the throttle element such that the pressure of the leakage fluid in the downstream pressure chamber is smaller than in the upstream pressure chamber. The pressure in the upstream pressure chamber and the pressure in the downstream pressure chamber exert a sealing force on the sealing element, which force reliably seals the machine element. In this way, a sealing device is provided which dynamically unfolds its sealing effect when pressure is applied and reliably and securely seals the region between the sealing element and the machine element. The sealing effect is based on the pressure force of the leakage fluid acting on the sealing element and thus on the pressure difference between the upstream pressure chamber and the downstream pressure chamber. The pressure of the leakage fluid in the upstream pressure chamber can only be partially reduced by means of the throttle element, so that the pressure of the leakage fluid in the downstream pressure chamber can still be significantly higher than the ambient pressure. Accordingly, the full, possibly very high pressure of the leakage fluid is not applied to the sealing element in this case, but rather a reduced pressure is applied which corresponds to a pressure difference between the upstream pressure chamber and the downstream pressure chamber. Such a reduction in the pressure acting on the sealing element improves the sealing performance of the sealing element and has an advantageous effect on the service life of the sealing element and the sealing device. While in the case of seals known from the prior art for the gap flow, the volume losses are 20% to 50% due to the leakage flow, the sealing device according to the invention reduces these volume losses many times over to around 2% to 5%, so that correspondingly less energy must be expended by a working machine in this regard in order to compensate for the volume losses. In this way, the solution according to the invention provides a sealing device which seals even high pressures reliably and with low fluid losses, while being low-wear and low-maintenance. With the sealing device according to the invention, an effective, low-wear seal can be achieved even at high pressures. Within the meaning of the invention, a throttle element can be any element that is configured to derive the pressure in the downstream pressure chamber from the pressure in the upstream pressure chamber by a predetermined throttling of the pressure in the upstream pressure chamber. Furthermore, within the meaning of the invention, the bypass line can be any type of connection which allows leakage fluid to be transported directly or indirectly between the upstream pressure chamber and the downstream pressure chamber. Finally, within the meaning of the invention, the machine element moving relative to the sealing element is to be understood as meaning a machine element which executes a rotating movement or an axial movement, so that the movement of the machine element always takes place relative to the sealing element.

In an embodiment of the invention, it is provided that the sealing element and the housing are mounted such that they can be moved relative to one another. Accordingly, the pressure in the downstream pressure chamber and/or the pressure in the upstream pressure chamber can exert a sealing force along an axial direction of the sealing device or of the machine element, wherein alternatively or additionally the pressure in the downstream pressure chamber and/or the pressure in the upstream pressure chamber can also exert a sealing force along a radial direction of the sealing device or of the machine element.

Accordingly, in a further embodiment of the invention, it is provided that, as a result of the predetermined pressure difference, the housing and the sealing element are sealingly mounted such that they can be displaced relative to one another, as a result of which the machine element can be dynamically sealed reliably and safely even at high pressures when the sealing device is pressurized. Consequently, the pressure of the upstream pressure chamber and the pressure of the downstream pressure chamber displace the housing and the sealing element in a sealing manner relative to one another, wherein the pressure of the upstream pressure chamber and the pressure of the downstream pressure chamber can displace the housing and the sealing element along an axial direction of the sealing device and/or of the machine element sealingly against one another. In this way, a particularly effective dynamic sealing effect can be achieved when pressure is applied to the sealing device, with the sealing effect adapting itself automatically and depending on the magnitude of the pressure applied.

According to the invention, the pressure in the downstream pressure chamber and thus the sealing force caused by it can increase with the pressure of the upstream pressure chamber, which can in particular be a linear increase. The sealing effect of the sealing device according to the invention thus increases automatically as the pressure of the working fluid increases and causes reliable sealing both in the axial direction and in the radial direction of the sealing unit or the machine element.

In an embodiment of the invention, the sealing device and the machine element can be arranged coaxially with one another, so that the axial directions and/or radial directions of the sealing device and machine element coincide.

According to one embodiment of the invention, the throttle element is designed in such a way that the pressure difference between the pressure of the upstream pressure chamber and the pressure of the downstream pressure chamber amounts to at most one quarter of the pressure of the upstream pressure chamber, particularly preferably one sixth of the pressure of the upstream pressure chamber. Thus, the pressure of the downstream pressure chamber is sufficiently high, and the pressure difference between the pressure of the upstream pressure chamber and the downstream pressure chamber is sufficiently low to realize reliable, low-wear sealing even at high working fluid pressures of the order of magnitude of, for example, 1000 bar to 6000 bar or more. In particular, the throttle element can be designed in such a way that, in the case of a plurality of sealing devices arranged one behind the other in series and forming a sealing system, the pressure difference between the pressure of a corresponding upstream pressure chamber and the pressure of a corresponding downstream pressure chamber amounts to 800 bar, preferably 250 bar to 600 bar. With the sealing device according to the invention, pressure differences of this magnitude can be sealed off reliably and with little wear, even with respect to rotating machine elements.

In a further embodiment, the invention provides that the sealing element is arranged in contact with the housing at least in portions. The fact that the sealing element rests at least in portions against both the machine element moving relative to the sealing element and against the housing means that a guidance of the leakage flow takes place in a defined or predetermined and thus controllable manner, which leakage flow flows through the bypass line in a controlled and predetermined manner.

With regard to the defined or predetermined and thus controllable guidance of the leakage flow, it is advantageous if at least one sealing body is provided, which is sealingly arranged between the sealing element and the housing.

With regard to advantageous service lives, the invention provides in a further embodiment that the sealing element has plastics material fibers, polyaramide fibers, carbon fibers, or Kevlar fibers.

In one embodiment of the invention, the upstream pressure chamber and/or the downstream pressure chamber can be accommodated at least partially within the housing.

According to an alternative embodiment, the upstream pressure chamber and/or the downstream pressure chamber can be arranged at least partially outside the housing.

Furthermore, according to one embodiment of the invention, the sealing element can be arranged on a top side of the housing, wherein the sealing element can be attached to a top side of the housing or accommodated in such a top side of the housing.

As an alternative to this, in one embodiment of the invention, the sealing element can be mounted such that it can move relative to the housing and/or be in contact with the housing.

In a further embodiment, the invention provides that the housing is formed at its downstream end with a radially inward-pointing support collar against which the sealing element rests. The support collar consequently prevents the sealing element from being pushed downstream in an uncontrolled manner as a result of the pressure of the leakage flow. Rather, the support collar defines a predetermined and maximum downstream position of the sealing element within the housing of the sealing device.

In a further embodiment of the invention, it is structurally particularly favorable with regard to a robust and durable sealing element if the sealing element has a first support ring, a second support ring, and a sealing member arranged between the first support ring and the second support ring, wherein the second support ring rests against the support collar. In particular, the first support ring can be in fluid communication with the upstream pressure chamber or can be pressurized by the upstream pressure chamber, and/or the second support ring can be in fluid communication with the downstream pressure chamber or can be pressurized by the downstream pressure chamber. In this way, the upstream pressure chamber, via the first support ring, and the downstream pressure chamber, via the second support ring, can effectively exert a sealing force on the sealing member therebetween. At the same time, the sealing member flanked on both sides by the first support ring and by the second support ring is effectively protected against wear. The sealing member can be designed in such a way that the sealing member dynamically seals against the housing when pressure is applied to the upstream pressure chamber and the downstream pressure chamber.

In one embodiment of the invention, the first support ring and/or the second support ring can also be connected to the sealing member in a fixed or detachable manner.

With regard to a defined or predetermined and thus controllable guidance of the leakage flow, it is advantageous in a further embodiment of the invention if at least one first sealant is sealingly arranged between the first support ring and the housing. It is also advantageous if, according to one embodiment of the invention, at least one second sealant is sealingly arranged between the second support ring and the housing. The sealant can be designed as O-rings, for example.

In order to maintain an effective sealing effect over a longer period of operation, the invention provides in an embodiment that the first support ring is mounted so that it is subjected to a spring force of a spring acting in the direction of the second support ring.

In one embodiment, the use of the sealing device can be made easier by arranging a filter element in the bypass line between the upstream end and the throttle element. In this way, the working fluid, from which the leakage flow emerges, does not have to meet any special purity requirements.

Particular advantages of the invention arise when a plurality of sealing devices according to the invention are successively arranged in series, as is provided for the sealing system according to the invention. In this way, even high pressures can be reduced successively or in cascades, and the stress and wear on the sealing elements of the individual sealing devices can be kept low. Accordingly, the sealing system according to the invention comprises a plurality of sealing devices arranged in series.

In order to be able to reduce the pressure of the leakage flow in the desired and specified manner and to avoid an accumulating pressure, the invention provides in the embodiment of the sealing system that the downstream pressure chamber of the downstream outlet sealing device, viewed in the direction of flow of the leakage fluid, is connected to a leakage fluid outlet.

In the sealing system according to the invention, the upstream pressure chamber of the corresponding downstream sealing device can be in fluid communication with the downstream pressure chamber of the corresponding upstream sealing device or can coincide partially or completely. In this way, a plurality of sealing devices can be efficiently connected in series to form a cascade in order to be able to successively reduce high pressures.

Accordingly, in an embodiment of the sealing system according to the invention, it is provided that the inlet sealing device is arranged lying upstream of the outlet sealing device with respect to the direction of flow of the leakage fluid, wherein the downstream pressure chamber of the inlet sealing device corresponds to the upstream pressure chamber of the outlet sealing device.

For example, in the sealing system according to the invention, a first housing, a first sealing element for sealing against the machine element, a first bypass line (for example through the first housing) between an upstream pressure chamber, which is subjected to a first pressure of the leakage fluid, and a downstream pressure chamber, and a first throttle element may be provided in the first bypass line, wherein the first throttling element is configured to set a pressure in the downstream pressure chamber, which pressure is lower than the pressure in the upstream pressure chamber and which exerts a first sealing force on the first sealing element. Such a sealing system further comprises a second housing, a second sealing element for sealing, a second bypass line (e.g. through the second housing) between the first downstream pressure chamber and a further downstream pressure chamber, and a second throttle element in the second bypass line, wherein the throttle element is configured to set a third pressure in the further downstream pressure chamber, which pressure is lower than the pressure of the upstream downstream pressure chamber and which exerts a second sealing force on the second sealing element. Accordingly, sealing systems can be constructed with more than two sealing devices in series, wherein in a particular embodiment the sealing devices can be arranged in series along a common axial direction of the sealing devices or an axial direction of the machine element.

In one embodiment of the sealing system according to the invention, it is provided that the inlet sealing device is arranged upstream of the outlet sealing device with respect to the direction of flow of the leakage fluid, wherein at least one intermediate sealing device having the features of the sealing device according to any of claims 1 to 12 is arranged between the inlet sealing device and the outlet sealing device, and wherein the sealing element of the at least one intermediate sealing device rests sealingly at least in portions against the machine element moving relative to the sealing element of the at least one intermediate sealing device.

Efficient cascading can be implemented for the configuration last described in that the downstream pressure chamber of the at least one intermediate sealing device arranged adjacent to the outlet sealing device corresponds to the upstream pressure chamber of the outlet sealing device, and the upstream pressure chamber of the at least one intermediate sealing device arranged adjacent to the inlet sealing device corresponds to the downstream pressure chamber of the inlet sealing device.

A particularly compact design for such a sealing system can be realized in an embodiment of the invention if the inlet sealing device and/or the outlet sealing device and/or the at least one intermediate sealing device are accommodated in a common seal housing.

According to one embodiment, the machine element can be mounted in a rotating and/or axially movable manner in relation to the sealing devices.

Desired and specified pressure differences can be achieved by adjusting the throttle element of the individual sealing devices arranged one behind the other. It is conceivable in an embodiment of the invention that the throttle element of the upstream inlet sealing device has a flow cross section which is larger than a flow cross section of the throttle element of the downstream outlet sealing device.

In the method according to the invention for sealing a leakage flow on a machine element which is circular in cross section, which machine element belongs to a working machine which works with a working fluid under high pressure, a sealing element is provided on the machine element, then an upstream pressure chamber is provided which is subjected to a first pressure of the leakage fluid. Thereafter, a downstream pressure chamber is provided which is opposed to the upstream pressure chamber with respect to the sealing element, and then a pressure is set in the downstream pressure chamber which is smaller than the pressure in the upstream pressure chamber and which exerts a sealing force on the sealing element. In this case, the downstream pressure chamber is fluidly connected to the upstream pressure chamber, which is implemented, for example, by means of the bypass line.

The method according to the invention comprises in particular the use of at least one sealing device or a sealing system. Thus, in a further embodiment, the method comprises providing a further sealing device on the machine element, providing yet another downstream pressure chamber, and setting a third pressure in the yet further downstream pressure chamber, wherein this pressure is lower than the pressure of the upstream pressure chamber and which exerts a sealing force on the still further sealing device.

Thus, according to one embodiment of the method according to the invention, it is provided that at least one further sealing device is installed in addition to and downstream of the at least one sealing device, wherein the further additional sealing device is brought into sealing contact with the machine element which is circular in cross section and extends in an axial direction, and wherein a pressure difference is achieved with the upstream sealing device, which pressure difference is equal to the pressure difference achieved with the one further additional sealing device.

In the method according to the invention, the pressure in the downstream pressure chamber is derived from the pressure in the upstream pressure chamber, which is implemented, for example, by throttling the pressure in the upstream pressure chamber by means of a throttle element.

In the case of the invention, the machine element to be sealed can be any element of a device or machine, depending on the application of the invention. In some embodiments, the machine element can be a pipeline into which a fluid is fed and the surroundings or casing of which is to be pressure-sealed against the fluid. Some of such applications involve a rotary union for a rotating tube. In other conceivable embodiments, the machine element can be axially movable, such as an axially movable piston, the casing of which is to be pressure-sealed relative to a cylinder. In very general terms, depending on the embodiment, the machine element can be mounted so that it can rotate and/or be axially movable relative to the sealing device. Fluids within the meaning of the present invention can comprise liquids and/or gases. Finally, a bypass line within the meaning of the invention is any potential passage or channel for the leakage fluid for which the seal according to the invention, i.e. the sealing device and the sealing system, is created.

It is self-evident that the features mentioned above and yet to be described below can be used not only in the combination described but also in other combinations or in isolation without departing from the scope of the present invention. The scope of the invention is defined only by the claims.

BRIEF DESCRIPTION OF THE DRAWING

Other details, features, and advantages of the subject matter of the invention can be found in the following description in connection with the drawing, in which preferred embodiments of the invention are presented by way of example. In the drawing.

DETAILED DESCRIPTION

The invention is described below with reference to FIGS. 1 to 4 in which the invention is explained using the example of a rotary union of a fluid line for a descaling device. Such a descaling device is used in steel or aluminum production to remove oxide deposits from hot or cold metal surfaces with the aid of water high-pressure. In such a descaling device, the metal surfaces are guided past fixed or rotating nozzles and are sprayed with water under a high water pressure of usually 1000 bar or more in order to loosen the scale. A descaling device of this type having rotating nozzle heads is known from U.S. Pat. Nos. 6,029,681 and 7,958,609. The fluid supply line to be sealed, through which the water which is under high pressure and represents a working fluid is guided to a nozzle head, rotates relative to a sealing element which serves to minimize the leakage flow resulting from the rotary union.

Descaling devices, in particular those with rotating fluid lines and rotating nozzle heads, place high demands on the sealing of the fluid supply line due to the high water pressures and the high volume flows. It goes without saying that the invention is not limited to descaling devices with rotating or fixed nozzle heads, but can be used advantageously in a wide variety of applications in which a machine element that moves relative to a sealing element and, in the case of the descaling device, is configured as the rotating fluid supply line is to be sealed effectively and with low wear. Such applications also comprise, for example, pumps or piston machines in which the movement relative to the sealing element is an axial movement.

Figure 1:
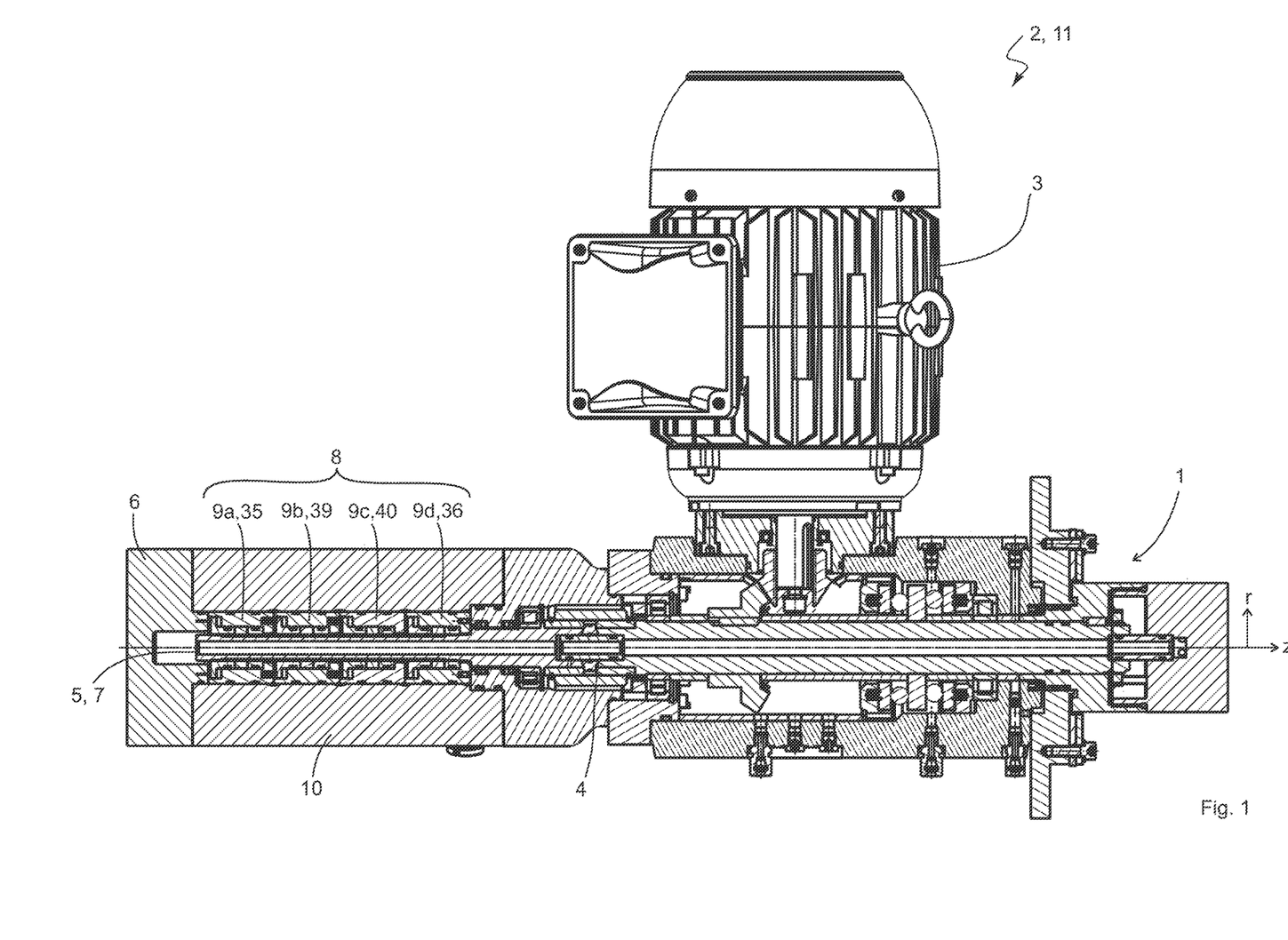
FIG. 1 is a schematic cross-sectional view of a rotating nozzle head of a working machine for descaling with a rotary union, wherein the working machine has a plurality of sealing devices according to the invention, which form a sealing system according to the invention.

FIG. 1 is a schematic sectional view of a rotating nozzle head 1 of a descaling device 2 which represents a working machine 11 within the meaning of the invention. The rotating nozzle head 1 is driven by an electric drive 3 of the descaling device 2 to rotate about the z-axis shown in FIG. 1, the r-axis indicating the radial direction. The rotating nozzle head 1 is rigidly connected to a fluid supply line 5 via a flange coupling 4 in such a way that the fluid supply line 5 is also driven in rotation indirectly via the electric drive 3 and the flange coupling 4. The rotating fluid supply line 5 is supplied with a working fluid, for example water under high pressure of the order of up to 1000 or 2000 bar, from a reservoir (not shown) via a stationary (non-rotating) connection adapter 6. In descaling devices of this type, the flow rate is usually in the range of up to 200 liters per minute and the rotational speed of the rotating nozzle head 1 and the fluid supply line 5 is in the range of up to 2000 revolutions per minute. The feeding of such large quantities of the working fluid which is under this high pressure into a rapidly rotating fluid supply line 5 places very high demands on the bearing and sealing of the fluid supply line 5 which represents a machine element 7 which is circular in cross section within the meaning of the invention. The machine element 7 which is designed as a hollow shaft in the embodiment is supplied with the working fluid which is under high pressure, via the connection adapter 6, wherein the fluid which does not get into the machine element 7 and rather flows outside and along the hollow shaft represents the leakage flow or the leakage fluid which is a part of the working fluid under high pressure. According to the embodiment shown in FIG. 1, the rotating fluid supply line 5 is mounted and sealed in a sealing system 8, wherein, in the embodiment, the stationary (non-rotating) sealing system 8 has four sealing devices 9a, 9b, 9c, and 9d which are accommodated in a common seal housing 10 and which are described in detail below with reference to FIGS. 2 to 4.

The four sealing devices 9a, 9b, 9c, and 9d are of substantially identical design and are arranged one behind the other along the z-axis, which corresponds to an axial direction, in the direction of flow of the working fluid or along the machine element 7. The sealing devices 9a, 9b, 9c, and 9d arranged in the manner of a cascade serve on the one hand for a rotary bearing of the fluid supply line 5 rotating about the z-axis or of the machine element 7 rotating about the z-axis. At the same time, the sealing devices 9a, 9b, 9c, and 9d work together to seal the casing of the fluid supply line 5 or of the machine element 7 from the surroundings and thus ensure that almost all of the working fluid that is made available and is under high pressure enters from the connection adapter 6 into the rotating fluid supply line 5 or into the machine element 7 moving relative to the sealing devices 9a, 9b, 9c, and 9d, and losses to the surroundings are avoided.

Figure 2:
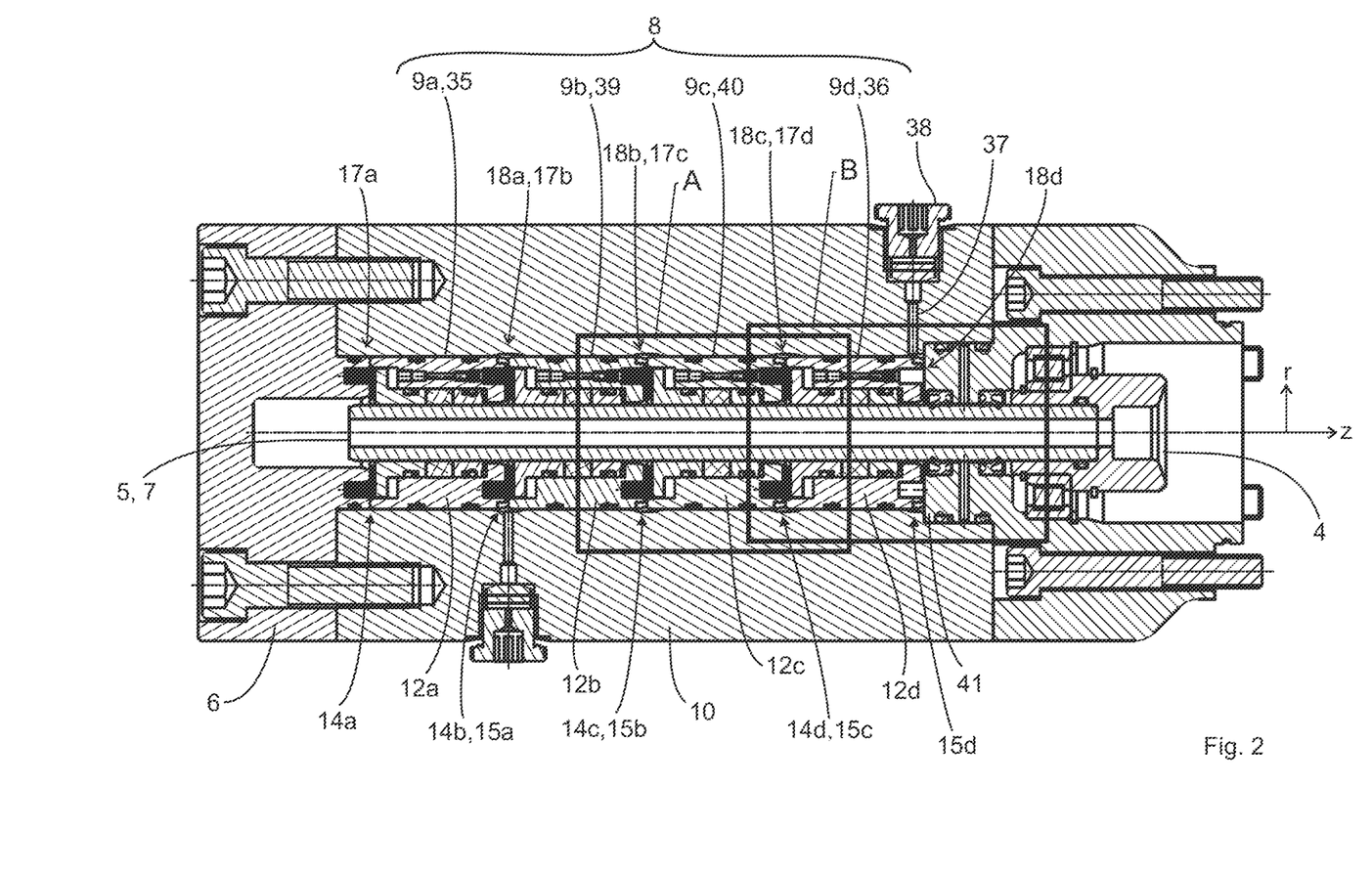
FIG. 2 shows an enlarged sectional view for the sealing system from FIG. 1.
Figure 3:
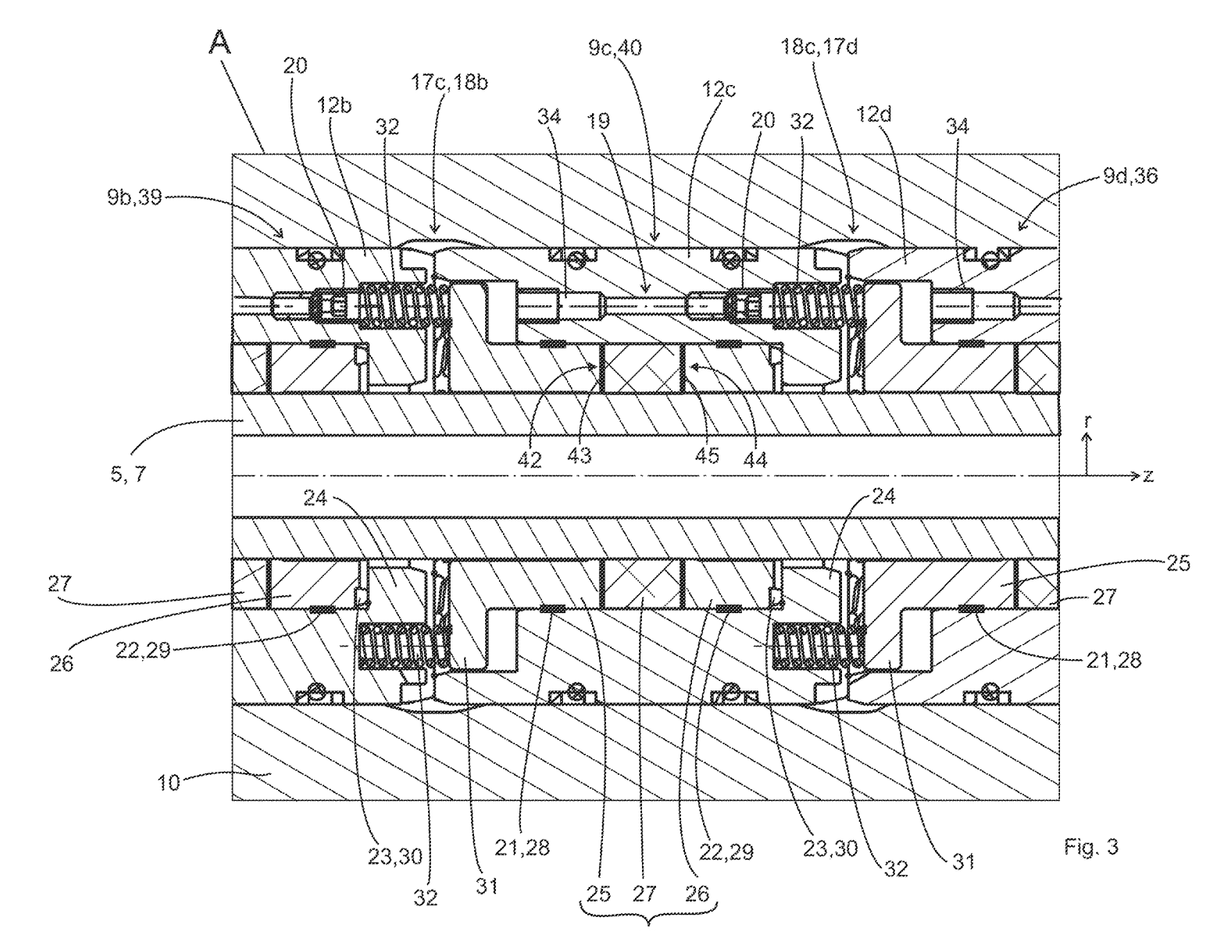
FIG. 3 is an enlarged sectional view A for a single sealing device of the sealing system of FIG. 2.
Figure 4:
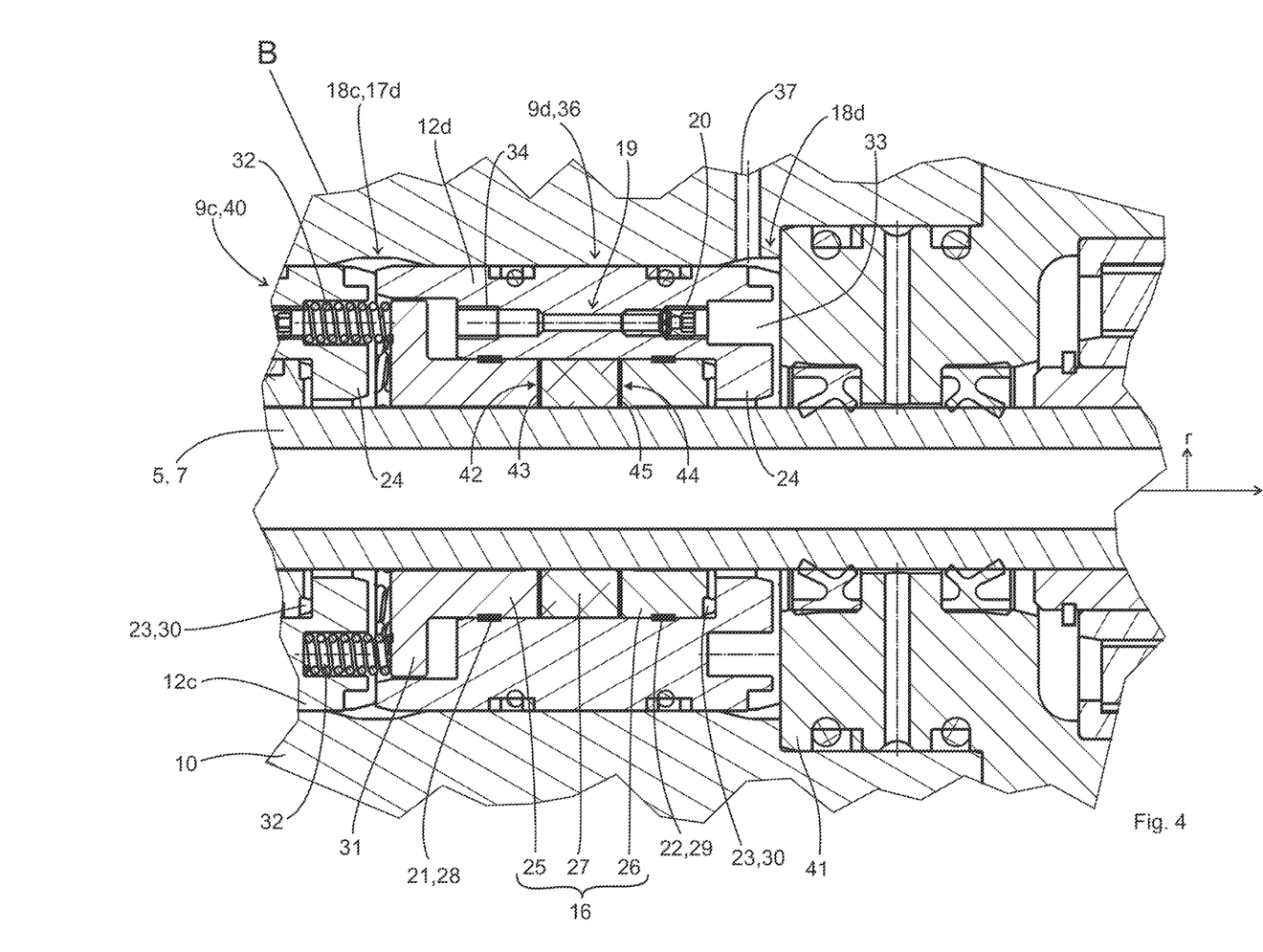
FIG. 4 is an enlarged sectional view B for another sealing device of the sealing system of FIG. 2.

FIG. 2 shows the sealing system 8 with the four sealing devices 9a, 9b, 9c, and 9d in an enlarged sectional view, which are arranged in series in the direction of the z-axis and are accommodated in the seal housing 10. Of course, fewer or more sealing devices can also form the sealing system 8. According to the invention, a single sealing device or any desired number of sealing devices for sealing a leakage flow can be provided on a machine element 7, which is circular in cross section, of a working machine 11 working with a working fluid that is under high pressure. The construction of an individual sealing device is shown in further, enlarged sectional views in FIGS. 3 and 4, the enlarged details being identified as section A and section B in FIG. 2. FIG. 3 shows the enlarged section A for the sealing device 9c, which is arranged between the two sealing devices 9b and 9d, whereas FIG. 4 shows the enlarged section B for the sealing device 9d, which is arranged downstream of the sealing device 9c and forms the end of the sealing system 8. Since the sealing devices 9a, 9b, 9c, and 9d substantially have the same structure and the same function, the following description of FIGS. 3 and 4 is to be understood as generally valid for all sealing devices 9a, 9b, 9c, and 9d, although the description should focus on the sealing device 9c or 9d. Differences or special features of the sealing devices 9a, 9b, 9c, and 9d are pointed out accordingly.

As can be seen overall from FIGS. 1 to 4 for the embodiment shown, a corresponding sealing device 9a, 9b, 9c, and 9d is designed in the shape of a circular cylinder and encloses a portion of the rotating machine element 7, which portion is formed by the fluid supply line 5 in the embodiment. Each individual sealing device 9a, 9b, 9c, and 9d has a tubular or cylindrical housing 12a, 12b, 12c, or 12d which has an upstream end 14a, 14b, 14c or 14d and a downstream end 15a, 15b, 15c, or 15d and through which the machine element 7 which is circular in cross section extends. A corresponding housing 12a, 12b, 12c, and 12d extends in the direction of the z-axis, i.e. in the axial direction of the working machine 11, along the machine element 7. Each sealing device 9a, 9b, 9c, 9d also comprises a sealing element 16 which is mounted within the associated housing 12a, 12b, 12c, 12d and which is designed to sealingly rest at least in portions against the machine element 7 moving relative to the corresponding sealing element 16. The corresponding sealing element 16 also extends along the z-axis and seals the casing of the rotating fluid supply line 5 or of the machine element 7. In each of the sealing devices 9a, 9b, 9c, 9d, the corresponding sealing element 16 and the associated housing 12a, 12b, 12c, 12d are mounted such that they can be moved relative to one another. In particular, the corresponding sealing element 16 is movable and accommodated in the associated housing 12a, 12b, 12c, 12d such that it can be displaced relative to the associated housing 12a, 12b, 12c, 12d.

A corresponding sealing device 9a, 9b, 9c, 9d also has an upstream pressure chamber 17a, 17b, 17c, 17d and a downstream pressure chamber 18a, 18b, 18c, 18d. A corresponding upstream pressure chamber 17a, 17b, 17c, 17d is arranged at the associated upstream end 14a, 14b, 14c, 14d of the corresponding housing 12a, 12b, 12c, 12d, whereas a corresponding downstream pressure chamber 18a, 18b, 18c, 18d is arranged at the associated downstream end 15a, 15b, 15c, 15d of the corresponding housing 12a, 12b, 12c, 12d. The corresponding sealing element 16 is arranged between the corresponding upstream pressure chamber 17a, 17b, 17c, 17d and the corresponding downstream pressure chamber 18a, 18b, 18c, 18d.

Each sealing device 9a, 9b, 9c, 9d also has a bypass line 19 which is designed to fluidly connect the upstream pressure chamber 17a, 17b, 17c, 17d to the downstream pressure chamber 18a, 18b, 18c, 18d. In the embodiment shown, a corresponding bypass line 19 runs inside the associated housing 12a, 12b, 12c, 12d, although, in an alternative embodiment, it is also conceivable that only a portion of the corresponding bypass line 19 runs inside the associated housing 12a, 12b, 12c, 12d, and the remaining portion runs, for example, inside the seal housing 10 or through the seal housing 10 and outside the seal housing 10. It is important for the invention that a corresponding bypass line 19 is arranged and configured to run around the corresponding sealing element 16 which rests at least in portions against the machine element 7.

Furthermore, each sealing device 9a, 9b, 9c, 9d has a throttle element 20 which is arranged in the associated bypass line 19 in each case. The corresponding throttle element 20 is designed in such a way that the corresponding throttle element 20 reduces the pressure of the leakage fluid flowing from the associated upstream pressure chamber 17a, 17b, 17c, 17d through the corresponding bypass line 19 to the associated downstream pressure chamber 18a, 18b, 18c, 18*d* by a predetermined pressure difference. Accordingly, a corresponding throttle element 20 is arranged between the associated upstream pressure chamber 17*a*, 17*b*, 17*c*, 17*d* and the associated downstream pressure chamber 18*a*, 18*b*, 18*c*, 18*d*. In the embodiment illustrated in the drawing, the corresponding throttle element 20 is arranged in the corresponding bypass line 19, although it is alternatively also conceivable for a corresponding throttle element 20 to be arranged either inside the seal housing 10 or outside the seal housing 10. The throttle element 20 arranged in the corresponding bypass line 19 throttles a first pressure of the associated upstream pressure chamber 17*a*, 17*b*, 17*c*, 17*d*, so that the associated downstream pressure chamber 18*a*, 18*b*, 18*c*, 18*d* is subjected to a second pressure which is smaller than the first pressure and is derived from the first pressure, depending on the setting of the throttle element 20 by a predetermined amount or proportion. The difference between the first pressure and the second pressure represents the predetermined pressure difference which is specified by setting the throttle element 20. In particular, as a result of the predetermined pressure difference, the housing 12*a*, 12*b*, 12*c*, or 12*d* and the associated sealing element 16 are mounted such that they can be displaced in a sealing manner relative to one another.

Although in the embodiment shown in the drawing each of the sealing devices 9*a*, 9*b*, 9*c*, 9*d* has a bypass line 19 and a throttle element 20 arranged in the bypass line 19, it is also conceivable in an alternative configuration that each sealing device 9*a*, 9*b*, 9*c*, 9*d* each has more than one bypass line 19 and a throttle element 20.

As can also be seen, for example, from FIGS. 3 and 4, the corresponding sealing element 16 is mounted within the associated housing 12*a*, 12*b*, 12*c*, 12*d*, wherein the sealing element 16 rests sealingly both against the machine element 7 and the associated housing 12*a*, 12*b*, 12*c*, 12*d*, at least in portions. In the embodiment shown in the drawing, a first sealing body 21, a second sealing body 22, and a third sealing body 23 ensure a seal between the corresponding sealing element 16 and the associated housing 12*a*, 12*b*, 12*c*, 12*d*, each of which are sealingly arranged between the corresponding sealing element 16 and the associated housing 12*a*, 12*b*, 12*c*, 12*d*. It can also be seen from FIGS. 3 and 4 that the corresponding housing 12*a*, 12*b*, 12*c*, 12*d* is designed with a support collar 24 directed radially inwards at its corresponding downstream end 15*a*, 15*b*, 15*c*, 15*d*. The corresponding sealing element 16 rests against the corresponding support collar 24, so that the support collar 24 serves as a type of stop for a maximum downstream displacement of the sealing element 16.

From FIGS. 3 and 4, it can be seen for the sealing devices 9*c* and 9*d* that a corresponding sealing element 16 has a first support ring 25, a second support ring 26, and a sealing member 27 arranged between the first support ring 25 and the second support ring 26, wherein the corresponding sealing elements 16 of the sealing devices 9*a* and 9*b* also each have a first support ring 25, a second support ring 26, and a sealing member 27 arranged between the first support ring 25 and the second support ring 26. The corresponding sealing member 27 is ring-shaped and encloses the fluid supply line 5 or the machine element 7. Furthermore, the second support ring 26 rests against the associated support collar 24 of the associated housing 12*a*, 12*b*, 12*c*, 12*d*. The sealing member 27 can have plastics material fibers, polyaramide fibers, carbon fibers, or Kevlar fibers. The first support ring 25 of each sealing device 9*a*, 9*b*, 9*c*, 9*d* is in fluid communication with the associated upstream pressure chamber 17*a*, 17*b*, 17*c*, 17*d*, while the second support ring 26 of each sealing device 9*a*, 9*b*, 9*c*, 9*d* is in fluid communication with the associated downstream pressure chamber 18*a*, 18*b*, 18*c*, 18*d*. With reference to FIGS. 3 and 4, the first support ring 25 is formed with a first sealing contour 43 on an end face 42 facing the sealing member, and the second supporting ring 27 is formed with a second sealing contour 44 on an end face 44 facing the sealing member. The first sealing contour 43 and/or the second sealing contour 45 each have a rough contour and are designed in such a way that sealing member 27 arranged between the first support ring 25 and the second support ring 26 merges into the first sealing contour 43 and/or into the second sealing contour 44, whereby a secure seal and a secure hold of the sealing member 27 between the first support ring 25 and the second support ring 26 is ensured, thereby preventing the sealing member 27 from moving in the direction of the associated housing 12*a*, 12*b*, 12*c*, 12*d* or in the direction of the fluid supply line 5 or of the machine element 7. A rough contour within the meaning of the invention is to be understood as meaning a surface condition in which the sealing contour 43 and/or the sealing contour 44 are formed with a non-smooth surface.

Furthermore, the first sealing body 21 corresponds to a first sealant 28, and the second sealing body 22 to a second sealant 29. The first sealant 28 is in the form of an O-ring which is inserted in a groove, for example, and which is sealingly arranged between the first support ring 25 and the associated housing 12*a*, 12*b*, 12*c*, 12*d*, wherein the second sealant 29 is also formed as a O-ring which is also inserted in a groove, for example, and which is sealingly arranged between the second support ring 26 and the associated housing 12*a*, 12*b*, 12*c*, 12*d*. A third sealant 30 corresponds in the illustrated embodiment to the third sealing body 23 and is arranged between the second support ring 26 and the support collar 24 of an associated housing 12*a*, 12*b*, 12*c*, 12*d*.

As can be seen in particular from FIGS. 3 and 4, the first support ring 25 is mounted so that it is subjected to a spring force acting in the direction of the second support ring 26. For this purpose, the end of the first support ring 25 of each sealing element 16 facing away from the second support ring 26 is formed with a pressure collar 31. A spring element 32 presses against this pressure collar 31 and generates the spring force which acts in the direction of the second support ring 26. A corresponding spring element 32 is mounted in a recess 33 which is formed in a housing 9*a*, 9*b*, 9*c* arranged upstream. In FIG. 4, such a recess 33 is also formed in the housing 9*d*, with no spring element being provided in this case since there is no further housing with a sealing element downstream of the housing 9*d*. Rather, the support collar 24 of the housing 12*d* rests against a housing end cover 41. Overall, therefore, in each sealing device 9*a*, 9*b*, 9*c*, 9*d*, the spring element 32 presses the first support ring 25 in the direction of the second support ring 26, which is thereby pressed against the support collar 24 and rests there, wherein the sealing member lying between the first support ring 25 and the second support ring 26 is compressed. Although only one spring element 32 is shown in the drawing, which presses on the first support ring 25 of a corresponding sealing device 9*a*, 9*b*, 9*c*, 9*d*, a plurality of spring elements 32 can also be arranged at one axial position in the circumferential direction of the first support ring 25 and act on the first support ring 25. The spring element 12 or the spring elements 12 serve to adjust a corresponding sealing device 9*a*, 9*b*, 9*c*, 9*d* when the associated sealing element 16 wears out.

In addition, in the embodiment shown in the drawing, a filter element 34 is provided in each bypass line 19. The filter element 34 is arranged between the corresponding upstream end 14a, 14b, 14c, 14d and the associated throttling element 20 and ensures the functioning of the corresponding throttling element 20 by filtering impurities in the leakage fluid, whereby clogging of the corresponding throttle element 20 is prevented, for example, and whereby no special attention must be paid to the purity of the working fluid.

The upstream pressure chamber 17a of the sealing device 9a is defined by the region upstream of the sealing device 9a. The other upstream pressure chambers 17b, 17c, 17d of the sealing devices 9b, 9c, 9d are delimited by an upstream side face of the sealing device 9b, 9c, 9d itself under consideration, by the upstream sealing device 9a or 9b or 9c, by an inner wall of the seal housing 10, and the casing of the fluid supply line 5 or of the machine element 7. The downstream pressure chambers 18a, 18b, 18c, 18d are correspondingly defined by a downstream side face of the sealing device 9a, 9b, 9c, 9d itself under consideration, by the downstream sealing device 9b or 9c, or by the housing end cover 41 (in the case of the sealing device 9d), by an inner wall of the seal housing 10, and the casing of the fluid supply line 5 or of the machine element 7. On the other hand, it applies to each of the upstream pressure chambers 17a, 17b, 17c, 17d that they are each defined by an upstream region of the annular gaps upstream of the associated throttle element 20, whereas the downstream pressure chambers 18a, 18b, 18c, 18d are defined by the downstream region of the annular gaps downstream of the associated throttle element 20.

The above description was directed to the structural design of a corresponding sealing device 9a, 9b, 9c, 9d, with the sealing devices 9a, 9b, 9c, 9d being of identical design. The four sealing devices 9a, 9b, 9c, 9d form the sealing system 8 in the embodiment shown in the drawing. The sealing device 9a represents an inlet sealing device 35, whereas the sealing device 9d represents an outlet sealing device 36. As can be seen from FIG. 2, the inlet sealing device 35 and the outlet sealing device 36 are arranged one behind the other in series with respect to the axial direction of the machine element 7, i.e. the fluid supply line 5, wherein the sealing element 16 of the inlet sealing device 35 and the sealing element 16 of the outlet sealing device 36 rest sealingly in portions against the machine element 7 which moves relative to the corresponding sealing element 16. In order to prevent the pressure of the leakage fluid or the leakage flow from building up, the downstream pressure chamber 18d of the outlet sealing device 36 is connected to a leakage fluid outlet 37. In the embodiment shown in the drawing, a throttle 38 is provided at the downstream end of the leakage fluid outlet 37, through which a pressure difference can again be set relative to atmospheric pressure, wherein the pressure difference amounts to at least 5 bar to 50 bar, preferably 15 bar to 25 bar. The support collar 24 of the sealing device 9d or the outlet sealing device 36 abuts against the housing end cover 41 as shown in FIGS. 2 and 4.

In the sealing system 8 shown in FIG. 2, the inlet sealing device 35 is arranged lying upstream of the outlet sealing device 36 with respect to the direction of flow of the leakage fluid. If the intermediate sealing devices 9b and 9c were omitted in the embodiment, then the downstream pressure chamber 18a of the inlet sealing device 35 would correspond to the upstream pressure chamber 17d of the outlet sealing device 36. However, in the embodiment, a first intermediate sealing device 39, which is the sealing device 9b, and a second intermediate sealing device 40, which is the sealing device 9c, are arranged between the inlet sealing device 35 and the outlet sealing device 36. The sealing element 16 of the first intermediate sealing device 39 and the sealing element 16 of the second intermediate sealing device 40 are in sealing contact with the machine element 7 in portions. The inlet sealing device 35, the outlet sealing device 36, the first intermediate sealing device 39, and the second intermediate sealing device 40 are accommodated in the seal housing 10. It can be seen that, instead of the two intermediate sealing devices 39 and 40, only a single intermediate sealing device or more than two intermediate sealing devices can be provided. Generally, in a sealing system 8 having inlet, outlet, and intermediate sealing devices, the downstream pressure chamber 18c of the intermediate sealing device 40 arranged adjacent to the outlet sealing device 36 corresponds to the upstream pressure chamber 17d of the outlet sealing device 36, wherein the upstream pressure chamber 17b of the intermediate sealing device 39 arranged adjacent to the inlet sealing device 35 corresponds to the downstream pressure chamber 18a of the inlet sealing device 35. Furthermore, the throttle element 20 of the upstream inlet sealing device 35 can have a flow cross section which is larger than a flow cross section of the throttle element 20 of the downstream outlet sealing device 36 and/or the intermediate sealing devices 39, 40.

During the operation of the sealing system 8, fluid such as water is fed under high pressure into the connection adapter 6 and from there into the rotating fluid supply line 5. The upstream pressure chamber 17a of the first sealing device 9a or the inlet sealing device 35 is thereby subjected to high pressure and passes this high pressure on via the bypass line 19 and through the throttle element 20 into the downstream pressure chamber 18a. In this way, a pressure difference is established between the upstream pressure chamber 17a and the downstream pressure chamber 18a, which pressure difference displaces the housing 12a and the sealing element 16 in opposite directions along the axial direction or z-axis, so that the sealing element 16 seals against the housing 12a. In addition, the pressurization of the upstream pressure chamber 17a and the downstream pressure chamber 18a against the surrounding seal housing 10 results in a radially inward pressure which acts on the sealing element 16 and against the casing of the rotating fluid supply line 5 and the rotating machine element 7. The fluid supply line 5 is thus effectively sealed both in the axial direction (see z-axis in the drawing) and in the radial direction (see r-axis in the drawing). The sealing is dynamic because it relies on pressurization of the upstream pressure chamber 17a and the downstream pressure chamber 18a, which sealing ultimately results from the feeding of the pressurized working fluid into the fluid supply line 5. In general, the higher the pressure in the upstream pressure chamber 17a, the higher the pressure in the downstream pressure chamber 18a and the more effective the sealing. The above-described principle of sealing in the axial direction and in the radial direction based on the predetermined pressure difference naturally also applies to the sealing devices 9b, 9c, and 9d. In the sealed state, the full pressure of the working fluid is not applied to the sealing element 16, but only the pressure difference between the corresponding upstream pressure chamber 17a, 17b, 17c, 17d and the corresponding downstream pressure chamber 18a, 18b, 18c, 18d. The reduced pressure drop improves sealing and protects the sealing element 16 from wear. This also reduces the leakage flow and increases the service life of the sealing unit.

By connecting the sealing devices 9a, 9b, 9c, 9d in series, as shown in FIG. 2, the high pressure in the connection adapter 6 in the sealing system 8 can be gradually reduced. If the outlet pressure in the connection adapter 6 amounts to 1000 bar, for example, the pressure difference between the corresponding upstream pressure chamber 17a, 17b, 17c, 17d and the associated downstream pressure chamber 18a, 18b, 18c, 18d per corresponding sealing device 9a, 9b, 9c, 9d can be set to approx. 250 bar, with the setting being made via the corresponding throttle element 20. By connecting the four sealing devices 9a, 9b, 9c, 9d in series, of which each individual sealing device 9a, 9b, 9c, 9d reduces a pressure of 250 bar, the high pressure at the connection adapter 6 can be completely eliminated over the entire length of the sealing system 8 and at the same time effectively minimize a leakage flow. If the flow rate through the fluid supply line 5 amounts to 200 liters per minute, for example, the sealing system 8 shown with a cascade of four sealing devices 9a, 9b, 9c, 9d in series allows a leakage rate of less than 1 liter per minute, i.e. less than 0.5% of the flow through the fluid supply line 5. The remaining leakage fluid is discharged via the leakage fluid outlet 37, the leakage fluid outlet 37 being connected to the downstream pressure chamber 18d of the sealing device 9d. It should be mentioned that, in addition to water, emulsions, oils, or other chemical liquids can also be used as the working fluid and thus also as the leakage fluid.

According to the method according to the invention for sealing a leakage flow on the machine element 7, which is circular in cross section, of a working machine 11 working with a working fluid under high pressure using at least one of the sealing devices 9a, 9b, 9c, 9d described above, the sealing element 16 of at least one of the sealing devices 9a, 9b, 9c, 9d is brought into sealing contact with the machine element 7 which is circular in cross section and extends in an axial direction. A first pressure is then set in the upstream pressure chamber 17a, 17b, 17c, 17d of the corresponding sealing device 9a, 9b, 9c, 9d by means of the leakage fluid of the leakage flow. A second, predetermined pressure is then set in the downstream pressure chamber 18a, 18b, 18c, 18d of the corresponding sealing device 9a, 9b, 9c, 9d by means of the throttle element 20 arranged in the bypass line 19. The sealing element 16 and the associated housing 12a, 12b, 12c, 12d are displaced in relation to one another with a sealing force as a result of a pressure difference achieved by the first pressure and the second, predetermined pressure. In the method, at least one further sealing device 9b, 9c, 9d can then be installed in addition to and downstream of the at least one sealing device 9a, wherein the further additional sealing device 9b, 9c, 9d is brought in sealing contact with the machine element 7 which is circular in cross section and extends in an axial direction. A pressure difference is thereby achieved with the upstream sealing device 9a, which pressure difference is equal to the pressure difference which is achieved with the one further additional sealing device 9b, 9c, 9d.

Of course, the invention described above is not limited to the described and illustrated embodiment. It can be seen that numerous modifications can be made to the embodiment depicted in the drawing, which are obvious to a person skilled in the art according to the intended application, without leaving the scope of the invention. Even though the invention is shown and described in the drawing using a rotating machine element, a person skilled in the art will recognize that the invention can also be applied to machine elements that move axially. The invention includes everything that is contained in the description and/or shown in the drawing, including anything that, deviating from the specific embodiment, is obvious to a person skilled in the art.

LIST OF REFERENCE SIGNS

1 Rotating nozzle head
2 Descaling device
3 Electric drive
4 Flange coupling
5 Fluid supply line
6 Connection adapter
7 Machine element
8 Sealing system
9a-d Sealing devices
10 Seal housing
11 Working machine
12a-d Housing
14a-d Upstream end
15a-d Downstream end
16 Sealing element
17a-d Upstream pressure chamber
18a-d Downstream pressure chamber
19 Bypass line
20 Throttle element
21 First sealing body
22 Second sealing body
23 Third sealing body
24 Support collar
25 First support ring
26 Second support ring
27 Sealing member
28 First sealant
29 Second sealant
30 Third sealant
31 Press-on collar
32 Spring element
33 Recess
34 Filter element
35 Inlet sealing device
36 Outlet sealing device
37 Leakage fluid outlet
38 Throttle
39 First intermediate sealing device
40 Second intermediate sealing device
41 Housing end cover
42 End face
43 First sealing contour
44 End face
45 Second sealing contour

The invention claimed is:

1. Sealing device for sealing a leakage flow on a machine element which is circular in cross section of a working machine working with a working fluid under high pressure, wherein the sealing device comprises:
    a tubular housing having an upstream end and a downstream end and through which the machine element which is circular in cross section can extend and which is accommodated in a seal housing,
    an upstream pressure chamber which is arranged at the upstream end of the tubular housing,
    a downstream pressure chamber which is arranged at the downstream end of the tubular housing,
    a sealing element which is arranged between the upstream pressure chamber and the downstream pressure chamber and is mounted within the tubular housing and which rests sealingly at least in portions against the machine element moving relative to the sealing element, a bypass line running around the sealing element, which bypass line is arranged to run at least in portions within the tubular housing and which is designed to fluidly connect the upstream pressure chamber to the downstream pressure chamber, and a throttle element designed to reduce the pressure of a leakage fluid flowing from the upstream pressure chamber through the bypass line to the downstream pressure chamber by a predetermined pressure difference which is arranged between the upstream pressure chamber and the downstream pressure chamber in the bypass line, wherein the leakage fluid is a part of the working fluid under high pressure, wherein the sealing element and the tubular housing are mounted such that they can be moved relative to one another based on the predetermined pressure difference, wherein the tubular housing includes a support collar directed radially inwards at the downstream end, against which the support collar and the sealing element rests, and wherein the sealing element has a first support ring, a second support ring, and a sealing member which is arranged between the first support ring and the second support ring, and wherein the second support ring rests against the support collar.

2. Sealing device according to claim 1, wherein, as a result of the predetermined pressure difference, the tubular housing and the sealing element are mounted such that they can be displaced in a sealing manner relative to one another.

3. Sealing device according to claim 1, wherein the sealing element is arranged in contact with the tubular housing at least in portions.

4. Sealing device according to claim 1, wherein the sealing element has plastics material fibers, polyaramide fibers, carbon fibers, or Kevlar fibers.

5. Sealing device according to claim 1, wherein at least one sealing body is provided which is sealingly arranged between the sealing element and the tubular housing.

6. Sealing device according to claim 1, wherein at least one first sealant sealingly arranged between the first support ring and the tubular housing.

7. Sealing device according to claim 6, wherein at least one second sealant is sealingly arranged between the second support ring and the tubular housing.

8. Sealing device according to claim 1, wherein the first support ring is mounted so that it is subjected to a spring force of a spring element acting in the direction of the second support ring.

9. Sealing device according to claim 1, wherein a filter element is arranged in the bypass line between the upstream end and the throttle element.

10. Sealing system comprising
an inlet sealing device having the features of the sealing device according to claim 1,
an outlet sealing device having the features of the sealing device according to claim 1, and
a machine element, which is circular in cross section and extends in an axial direction, of a working machine which is designed to work with a working fluid that is under high pressure,
wherein the inlet sealing device and the outlet sealing device are arranged one behind the other in series with respect to the axial direction of the machine element, and the corresponding sealing element of the inlet sealing device and the outlet sealing device rest sealingly at least in portions against the machine element moving relative to the corresponding sealing element.

11. Sealing system according to claim 10, wherein the downstream pressure chamber of the downstream outlet sealing device, viewed in the direction of flow of the leakage fluid, is connected to a leakage fluid outlet.

12. Sealing system according to claim 10, wherein the inlet sealing device is arranged lying upstream of the outlet sealing device with respect to the direction of flow of the leakage fluid, wherein the downstream pressure chamber of the inlet sealing device corresponds to the upstream pressure chamber of the outlet sealing device.

13. Sealing system according to claim 10, wherein the throttle element of the upstream inlet sealing device has a flow cross section which is larger than a flow cross section of the throttle element of the downstream outlet sealing device.

14. Sealing system according to claim 10, wherein the inlet sealing device is arranged lying upstream of the outlet sealing device with respect to the direction of flow of the leakage fluid, wherein at least one intermediate sealing device having the features of the sealing device according to claim 1 is arranged between the inlet sealing device and the outlet sealing device, and wherein the sealing element of the at least one intermediate sealing device rests sealingly at least in portions against the machine element moving relative to the sealing element of the at least one intermediate sealing device.

15. Sealing system according to claim 14, wherein the inlet sealing device and/or the outlet sealing device and/or the at least one intermediate sealing device are accommodated in the seal housing.

16. Sealing system according to claim 14, wherein the downstream pressure chamber of the at least one intermediate sealing device arranged adjacent to the outlet sealing device corresponds to the upstream pressure chamber of the outlet sealing device, and wherein the upstream pressure chamber of the at least one intermediate sealing device arranged adjacent to the inlet sealing device corresponds to the downstream pressure chamber of the inlet sealing device.

17. Method for sealing a leakage flow on a machine element which is circular in cross section of a working machine working with a working fluid under high pressure using the at least one sealing device according to claim 1,
wherein the sealing element of the at least one sealing device is brought into sealing contact with the machine element, which is circular in cross section and extends in an axial direction,
wherein a first pressure is set in the upstream pressure chamber of the at least one sealing device by means of the leakage fluid of the leakage flow,
wherein a second, predetermined pressure is set in the downstream pressure chamber of the at least one sealing device by means of the throttle element arranged in the bypass line, and
wherein the sealing element and the tubular housing are displaced against one another with a sealing force by a pressure difference achieved by the first pressure and the second, predetermined pressure.

18. Method according to claim 17, wherein at least one further sealing device is installed in addition to and downstream of the at least one sealing device, wherein the at least one further sealing device is brought in sealing contact with the machine element, which is circular in cross section and extends in an axial direction, and wherein a pressure difference is achieved with the upstream sealing device, which pressure difference is equal to the pressure difference which is achieved with the one further additional sealing device.

\* \* \* \* \*